(12) United States Patent
Krishnan et al.

(10) Patent No.: US 8,628,714 B2
(45) Date of Patent: Jan. 14, 2014

(54) SYSTEM AND METHOD FOR PROVIDING THE CAPABILITY OF PEELING THIN POLYMER FILMS FROM A SUBSTRATE

(75) Inventors: Sriram Krishnan, Cambridge, MA (US); Sanjay Sarma, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 540 days.

(21) Appl. No.: 12/443,141

(22) PCT Filed: Sep. 28, 2007

(86) PCT No.: PCT/US2007/020940
§ 371 (c)(1),
(2), (4) Date: Dec. 21, 2009

(87) PCT Pub. No.: WO2008/060358
PCT Pub. Date: May 22, 2008

(65) Prior Publication Data
US 2010/0109199 A1 May 6, 2010

(51) Int. Cl.
*B29C 41/42* (2006.01)

(52) U.S. Cl.
USPC ............................................................ 264/334

(58) Field of Classification Search
USPC ............................................................ 264/334
See application file for complete search history.

(56) References Cited

U.S. PATENT DOCUMENTS

2001/0018949 A1* 9/2001 Mizutani et al. ............... 156/233
2006/0038182 A1* 2/2006 Rogers et al. .................... 257/77

\* cited by examiner

*Primary Examiner* — Larry Thrower
(74) *Attorney, Agent, or Firm* — Peter A. Nieves; Sheehan Phinney Bass + Green PA

(57) ABSTRACT

A system and method for providing the capability of peeling thin polymer films from a substrate is provided. Generally, the method contains the steps of: providing a substrate having a top surface and a bottom surface; placing a peel initiator on the top surface; applying a polymer on the top surface of the substrate and a top surface of the peel initiator; curing the polymer, resulting in a thin-polymer film; and peeling the peel initiator from the substrate, thereby removing the thin-polymer film from the top surface of the substrate.

16 Claims, 10 Drawing Sheets

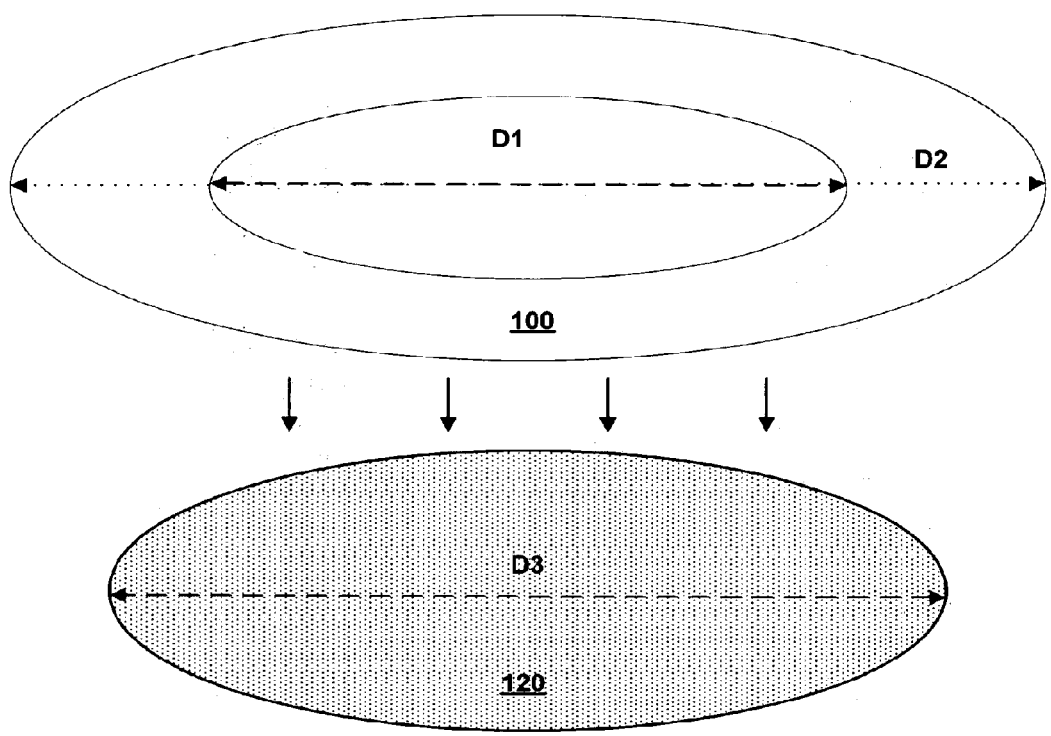
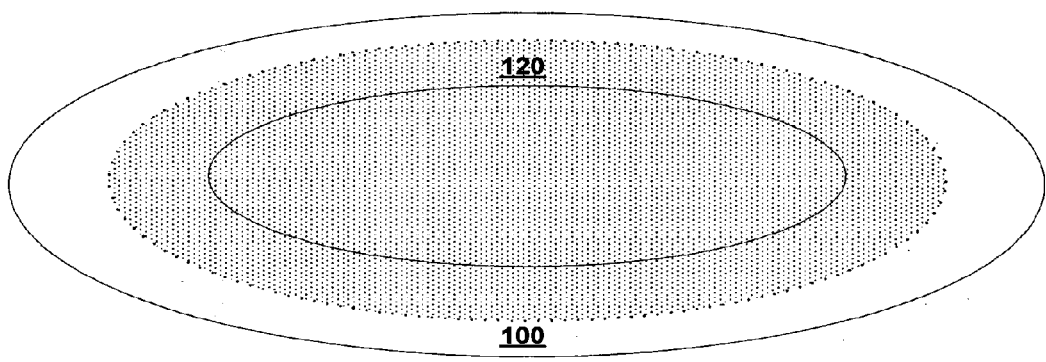
FIG. 4

PEELFRONT

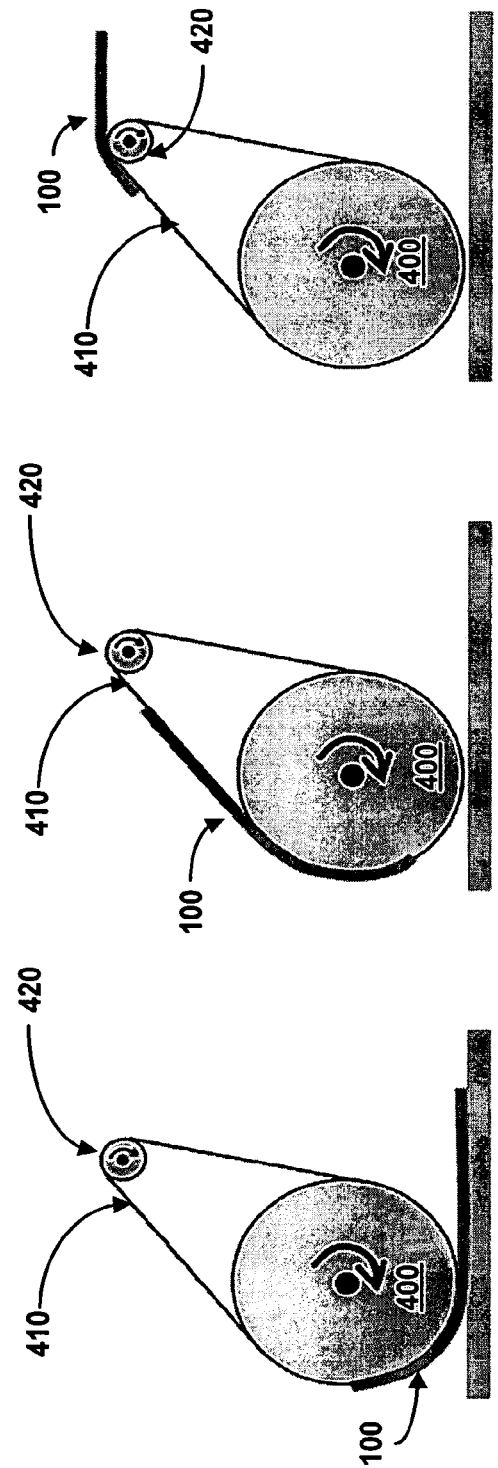

SYSTEM AND METHOD FOR PROVIDING THE CAPABILITY OF PEELING THIN POLYMER FILMS FROM A SUBSTRATE

CROSS-REFERENCE TO RELATED APPLICATION

This application claims priority to copending U.S. Provisional Application entitled, "PROCESS FOR PEELING THIN POLYMER FILMS FROM A SUBSTRATE," having Ser. No. 60/848,567, filed Sep. 29, 2006, which is entirely incorporated herein by reference.

FIELD OF THE INVENTION

The present invention is generally related to soft lithography, and more particularly is related to systems and methods for peeling very thin elastomeric films from rigid substrates.

BACKGROUND OF THE INVENTION

Soft-lithography and micro-contact printing are tools of choice in contemporary research in areas such as, but not limited to, tissue engineering, microfluidics, and protein patterning on surfaces. Thin elastomeric films, such as, but not limited to, polydimethylsiloxane (PDMS) films, are used in a number of applications in soft lithography. The thin elastomeric films, such as polymer films, have several current applications such as, but not limited to, use in microfluidics, in cell and protein patterning, and as tissue engineering scaffolds. Thin polymer films prepared using soft lithography have several advantages over conventional microfabrication techniques including faster turnaround times, room-temperature processing, and lower overall cost.

Thin elastomeric films often need to be peeled from a substrate. Currently, the process of peeling the films from a substrate is a difficult manual process having low yield and requiring delicate manual manipulation. Unfortunately, manual peeling requires a great deal of skill and often causes damage to the films, leading to yields that are relatively low.

An example of elastomeric film fabrication and removal from a substrate is as follows. An elastomer, described herein as a PDMS polymer, for exemplary purposes, may be spin-coated on a uniformly flat or patterned glass or silicon substrate. The polymer is dried in an oven to let the polymer cure and turn into a solid film. When the peeled film is carefully peeled from the substrate, the film carries the negative of patterns on the substrate and can then be used for further downstream processes. When thin PDMS films are used in soft lithographic processes, it is necessary to peel the film off a silicon or glass master. Currently, the film is peeled from the mold by hand. By inserting a knife or the sharp point of tweezers under the edge of the film, the operator frees a small portion of the film from the surface so that it can be gripped by hand. FIG. 1 is a schematic diagram illustrating the prior art manner of providing for peeling of the film from the surface. The film is then held by hand and peeled off delicately. Unfortunately, as mentioned above, this manual action is difficult to perform without tearing the film or otherwise damaging it, and film damage is common. Success in peeling depends very much on the dexterity and the physical skill of the operator.

Even after a portion of the film has been peeled off the substrate, thin PDMS films tend to tear from the periphery. An edge bead formed during spin-coating is one important cause of such damage. The edge bead results from overflow of the polymer over the edge of the substrate. Upon curing, the overflow region locks the film around the edge and prevents uniform separation as the peeling process proceeds. This uneven separation causes tearing. To avoid such tearing, the substrate edge is scraped manually. Depending on the speed of spin-coating, the edge bead could be twice as thick as the PDMS film being peeled. The comparatively thin PDMS film would then be unable to provide sufficient strain energy for the edge bead to peel, resulting in tearing.

It should also be noted that when peeling a thin PDMS film, the overall geometry of the substrate affects the actuation that needs to be applied. Specifically, when peeling a film over a silicon wafer, the applied force must increase to account for the gradually increasing width of film. Once more than half the film has been peeled, the amount of force required to peel starts decreasing. If the operator does not diligently adjust her effort accordingly, the film peels off in an uncontrollable fashion and could tear.

FIG. 2 is a schematic diagram illustrating force actuation vs. peel length during peeling a film from a substrate, such as a circular wafer. As is illustrated by FIG. 1, from point A to point B, force increases as the width of film being peeled increases. From point B to point C, the width of film decreases and potentially causes instability.

Repeatability and efficiency are two key attributes of production-ready manufacturing processes. As mentioned above, the peeling process is not very repeatable. In fact, the physics of peeling are complex. Two key insights that can be drawn with regard to peeling include that peeling depends on a number of material properties such as, but not limited to, the surface energy of PDMS with regard to Silicon, and the Youngs modulus of PDMS, and geometric criteria such as, but not limited to, the angle of peeling and the method of peeling.

With the rapid development of PDMS in both experimentation and as a potential mass manufacturing technique, peeling is likely to be a bottleneck to the manufacturing process. An example of current process for preparing of PDMS includes the following and does not yield repeatable product. The process begins when the substrate is cleaned to remove organic contaminants, dried using nitrogen and coated with a monolayer of silane to reduce the adhesion between PDMS and silicon dioxide. A common method for preparing a PDMS sample is using a monomer and cross-linker in 10:1 ratio. The mixture of monomer and cross-linker is degassed and spin-coated on the substrate. The spin-coating rpm and the duration are chosen based on the final thickness desired. For example, spin-coating at 1000 rpm for 60 seconds results in a film about 100 µm thick. The sample is then baked in an oven (e.g., at 85° between 20 mins and a few hours). Unfortunately, variations in these steps and process parameters greatly affect the material property of the PDMS film. Even for the same preparation method, the material properties of the PDMS film are not repeatable. The modulus of elasticity of the film is very sensitive to the cross-linking ration. The final film thickness varies over the entire area of the substrate and is highly sensitive to changes in the spin-coating rotations per minute (rpm) and duration. Finally, it is difficult to repeatably create films of the same thickness.

Thus, a heretofore unaddressed need exists in the industry to address the aforementioned deficiencies and inadequacies.

SUMMARY OF THE INVENTION

Embodiments of the present invention provide a system and method for providing the capability of peeling thin polymer films from a substrate. Briefly described, one embodiment of such a method, among others, can be broadly summarized by the following steps: providing a substrate having a top surface and a bottom surface; placing a peel initiator on the top surface; applying a polymer on the top surface of the substrate and a top surface of the peel initiator; curing the polymer, resulting in a thin-polymer film; and peeling the peel initiator from the substrate, thereby removing the thin-polymer film from the top surface of the substrate.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 3 is a schematic diagram illustrating the peel initiator located above a substrate.

FIG. 4 is a schematic diagram illustrating the peel initiator positioned on the substrate.

FIG. 12A, FIG. 12B, and FIG. 12C are schematic diagrams illustrating different stages of one exemplary system that may be used for removing the peel initiator and thin film from the roller.

DETAILED DESCRIPTION

Figure 1:
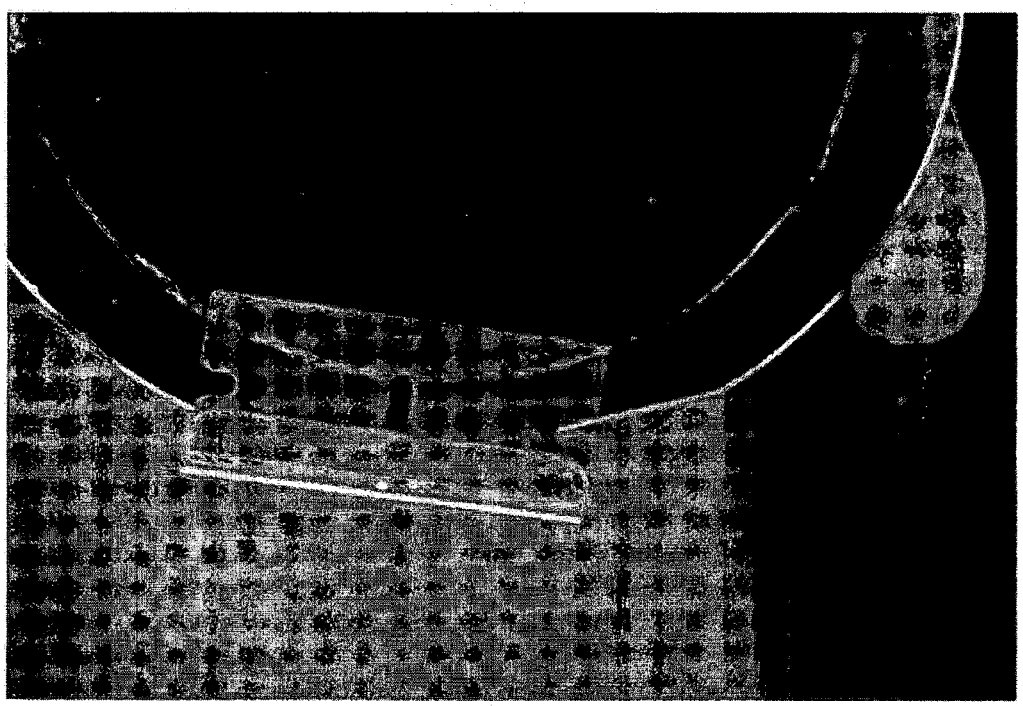
FIG. 1 is a schematic diagram illustrating the prior art manner of providing for peeling of the film from the surface.
Figure 2:
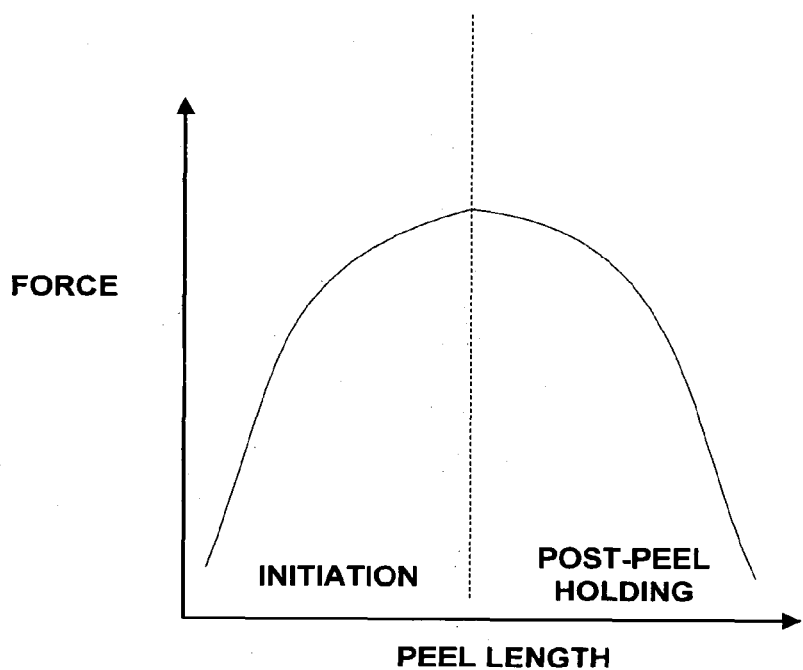
FIG. 2 is a schematic diagram illustrating force actuation vs. peel length during peeling a film from a circular wafer.

The present invention provides systems and methods for improving the reliability of peeling thin polymer films from a substrate. The process is made more reliable and repeatable by using a number of instrumental aids, including, a peel initiator, scaffolding, and preloading. Via use of these aids, the process of peeling thin polymer films is made repeatable and accurate enough to admit automation.

For exemplary purposes, the following provides the example of the thin polymer film being a polydimethylsiloxane (PDMS) film. PDMS is the material of choice in many applications of soft-lithography and micro fluidics. The hyperelastic property of PDMS and its low level of surface adhesion are useful in spin coating thin films on Silicon and glass surfaces with micropatterns and peeling the film to obtain the negative of the surface patterns on the film. It should be noted, however, that the description of using PDMS film is provided merely for exemplary purposes and is not intended to limit the present invention to only use of PDMS. One having ordinary skill in the art will appreciate that a different polymer film may replace the PDMS film in the present invention.

A device developed to assist in making the process of peeling thin polymer films more predictable preferably accomplishes the steps of: initiating the peel; parting the film separately; and handling and transporting the peeled film away from the substrate, such as a wafer.

In accordance with a first exemplary embodiment of the invention, a peel initiator is provided to assist with the process of initiating the separation of PDMS film from a substrate. Specifically, after spin coating without a peel initiator, PDMS film is typically adhered everywhere to a substrate without any location for initiation or holding. During the spin-coating step, the polymer flows all over the substrate and creates a film that is adhered everywhere to the substrate. In many cases, the film overflows an edge of the substrate and gets attached under a substrate wafer periphery. As a result, at the end of spin-coating the polymer onto the substrate, there is no location where the film is free from the surface of the substrate and hence, peel initiation is difficult.

FIG. 3 is a schematic diagram illustrating the peel initiator 100 located above a substrate 120, in accordance with a first exemplary embodiment of the invention. In addition, FIG. 4 is a schematic diagram illustrating the peel initiator 100 positioned on the substrate 120. As described in detail below, the peel initiator 100 serves to improve the efficiency of the peeling process. In addition, the peel initiator 100 also provides an easy way for gripping the thin film during and after peeling.

Referring to FIG. 3 and FIG. 4, in accordance with the first exemplary embodiment of the invention, the peel initiator 100 is an annulus (ring), made of a stiff material. Examples of such a stiff material may include, but are not limited to, metal, paper, and a polymer, such as, but not limited to, Polyethylene Terephthalate (PET).

With regard to the use of metal for the peel initiator, a metal peel initiator 100 may be fabricated by taking thin metal shims and supporting them between sheets of aluminum for support, and then cutting the metal into a desired shape using, for example, waterjet cutting. Alternatively, layers of wood or foam may be used for support. Once cut into the designed shape, to apply the metal peel initiator to the substrate, the metal peel initiator may be coated with a thin layer of low-tack spray adhesive and applied on the substrate. As an example, the metal shim peel initiator may be made out of stainless steel and be 25 microns thick. Of course, other thicknesses of the metal shim peel initiator may be used. It should also be noted that stiffness of the peel initiator 100 is a factor since having a peel initiator 100 that is much stiffer or higher-yielded in strength than the film could result in the peel initiator 100 tearing the film.

Alternatively, for fabrication of a PET peel initiator, a large portion of PET film (with a pre-coated adhesive such as found in scotch tape) is first applied on a backing and then using, for example, a graphics plotter such as a CAD plotter, a designed shape is cut in the PET film. The PET peel initiator may be made out of, for example, but not limited to, polyester film. The PET film cannot be directly cut into a shape, as it is too flimsy to handle. The PET peel initiator is then peeled off the backing and applied to the substrate while avoiding wrinkles at an inner perimeter. As an example, the PET peel initiator may be 30 microns thick. Of course, other thicknesses of the PET peel initiator may be used.

Referring to the process for fabrication of a paper peel initiator, the paper peel initiator is cut with, for example, a razor or a graphics plotter to the designed shape. The cut portion is then sprayed with a low-tack adhesive on one side and then applied onto the substrate without wrinkling.

The peel initiator 100 has an inner diameter D1, and an outer diameter D2, where the outer diameter D2 is larger than the inner diameter D1. As is described in further detail hereinbelow, the peel initiator 100 is made of a thinner and yet stiffer material than the PDMS film, where the PDMS film may be spin coated onto the substrate 120. For the design of the peel initiator 100 material, the following conditions are to be satisfied:

$$D_{initiator} \gg D_{film}$$

$$h_{initiator} \ll h_{film}$$

where D is the flexural rigidity and h is the thickness of the film.

The stiffness of the peel initiator 100 helps in handling the overall PDMS film around the periphery of the substrate 100. As an example, the peel initiator 100 may be between 25 and 50 microns thick for PDMS films that are spin-coated at about 150 to 350 microns thickness. It should be noted however, that the abovementioned is merely provided for exemplary purposes and is not intended to be a limitation to size of the peel initiator 100, the substrate 120, or the thin film.

The stiffness of the peel initiator 100 helps in handling the overall PDMS film around the periphery of the substrate 120. Specifically, the use of the peel initiator 100 enables peeling through kinematics (conditions based on geometry) rather than parameters of material failure. The peel initiator 100 can be used, for example, directly by a human operator to obtain better purchase on the thin film. Even a simple embodiment of the peel initiator 100 vastly improves the efficiency of peeling by hand. In addition, as mentioned below, the peel initiator 100 may be used in an automated process.

Figure 5:
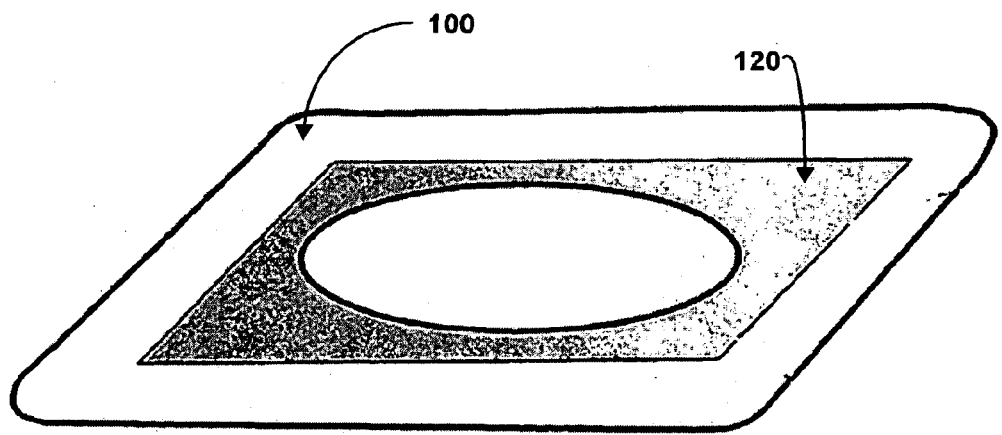
FIG. 5 is a schematic diagram illustrating the peel initiator and substrate having a shape different from the shape illustrated by FIG. 3.
Figure 6:
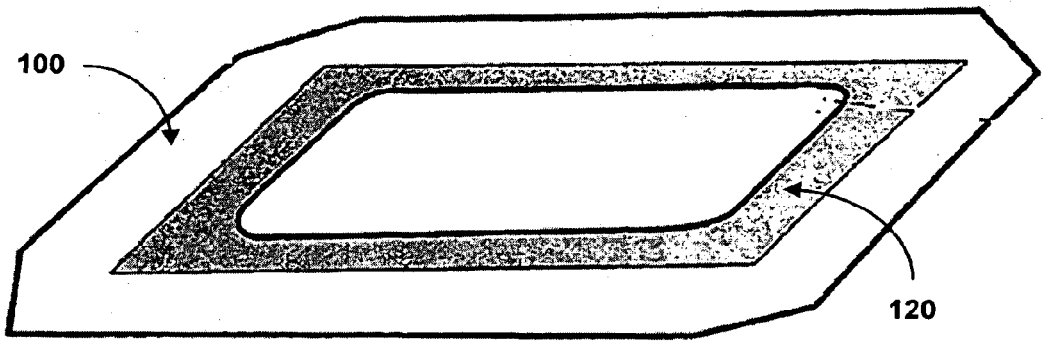
FIG. 6 is a schematic diagram illustrating the peel initiator and substrate having a shape different from the shape illustrated by FIG. 3 and the shape illustrated by FIG. 6.

Preferably, the peel initiator 100 has an inner perimeter that is smooth and convex in shape. Alternatively, an outer perimeter of the peel initiator 100 can have any geometric shape, so long as the peel initiator 100 extends beyond the periphery of the substrate 120. While FIG. 3 and FIG. 4 illustrate a substrate 120 and peel initiator 100 that are oval in shape, FIG. 5 and FIG. 6 provide alternative shapes of the substrate 120 and the peel initiator 100. It should be noted, however, that in the configurations of both FIG. 5 and FIG. 6, the substrate 120 edges are still completely covered by the peel initiator 100.

The substrate 120 may be, for example, a silicon wafer or a glass disk. It should be noted, however, that a different substrate may be used in replacement of the Silicon wafer or glass disk. The substrate 120 has a diameter D3, which is larger than the inner diameter D1 of the peel initiator 100 and smaller than the outer diameter D2 of the peel initiator 100. In addition, the substrate 120 contains a top surface 122. It should be noted that the substrate 120 may have microfeatures on the top surface 122, resulting in a negative imprint of the microfeatures being imprinted on the thin film.

Figure 7:
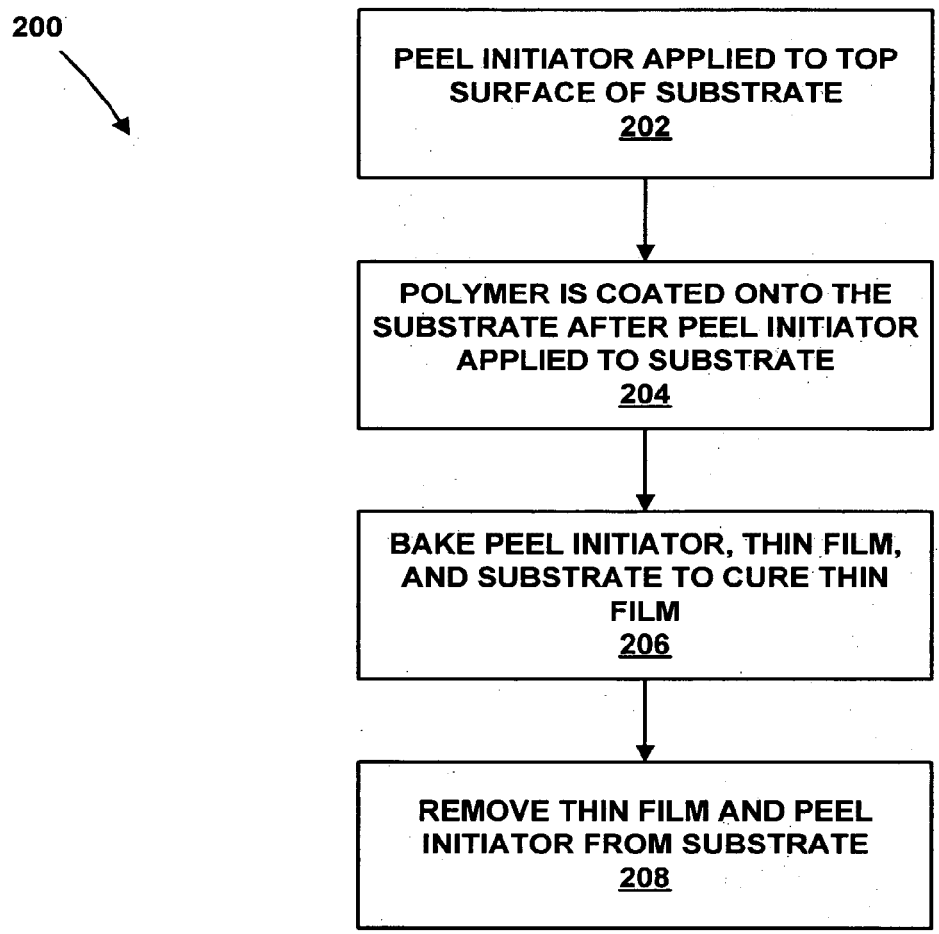
FIG. 7 is a flowchart illustrating a method for providing the capability of peeling thin polymer films from a substrate.

FIG. 7 is a flowchart 200 illustrating a method for providing the capability of peeling thin polymer films from a substrate 120. It should be noted that any process descriptions or blocks in flowcharts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 202, the peel initiator 100 is applied to the top surface 122 of the substrate 120. Preferably, the peel initiator 100 is aligned concentric to a circular edge of the substrate 120.

To avoid moving of the peel initiator 100 from the surface of the substrate 120 during activities, such as, but not limited to, spin coating, the peel initiator 100 is removably affixed to the surface of the substrate 120. Specifically, when the thin annular peel initiator 100 is affixed to the substrate 120, it is very likely to wrinkle due to trapped air pockets. Wrinkling at the inner perimeter could cause the PDMS polymer to seep under the peel initiator 100 during spin coating and potentially tear the film during peeling. Due to the above-mentioned, a uniform preload is applied on the peel initiator 100 to help make sure that there is continual and unbroken contact at the inner perimeter of the peel initiator 100. For example, one could use surface tension as a source for applying the preload.

Adhesive contact between the peel initiator 100 and the substrate 120 is one solution to provide uniform preload and at the least, a continuous contact along the inner periphery. As an example, a pre-coated adhesive in the case of scotch tape like material or a film of water or oil may be used to hold the peel initiator 100 to the substrate 120 by surface tension. The adhesive should not degrade during thin film curing and further, should not outgas or react with the PDMS film. Furthermore, the adhesive should not react with the substrate 120. In addition, the adhesive must not adhere permanently to the substrate 120 or leave debris on the substrate 120, otherwise known as ghosting.

A magnetic preload using a thin magnetic metal shim is an example of another possibility. Specifically, a magnetic preload using a ferromagnetic peel initiator 100 material may be used, with magnets located beneath the substrate 120.

When an adhesive is used to affix the peel initiator 100 to the substrate 120, out-gassing during a baking step (explained below) may be a problem. Out-gassing might lead to air bubbles entrapped under the PDMS film, potentially causing a tear. To avoid out-gassing, the following optional steps may be performed: 1. Use spray adhesive that is rated to perform optimally in the baking temperature range; 2. After applying the initiator and before spin-coating the polymer, perform a pre-heating step that will eliminate any volatile compounds under the peel initiator. It should be noted that the peel initiator 100 preferably adheres well to the polymer, but adheres weakly to the substrate 120, thereby promoting clean initiation of separation.

As is shown by block 204, PDMS (i.e., polymer) is coated onto the substrate 120 after the peel initiator 100 has been removably affixed to the substrate 120. As an example, the PDMS may be spin coated onto the substrate 120. During spin coating, the polymer flows over the substrate 120 and creates a thin film that is adhered to the substrate 120 and the peel initiator 100. Preferably, the top surface 122 of the substrate 120 that is exposed after the peel initiator 100 has been removably affixed thereto, is completely covered by the PDMS. The PDMS may also overflow edges of the peel initiator 100, although this is not required. The peel initiator 100 avoids the problem of beading of the polymer around the periphery or on the sides of the substrate 120. Alternatively, if the peel initiator 100 were not used, if liquid PDMS seeped around the sides of the substrate 120, the PDMS could potentially be stuck during peeling causing the film to tear.

It should be noted that spin coating of PDMS can be modeled as an axisymmetric viscous flow. The height of the PDMS film during spin coating is sensitive to the initial thickness, material properties and the process parameters, namely spin speed and time duration. By making the initial pour volume large, the spin coating thickness control is made robust and the film thickness depends on its properties, spin speed, and time.

As is mentioned above, the thickness of the peel initiator 100 is much less than thickness of the PDMS film that is spun coat. As an example, the resulting PDMS film may be between 100 and 300 microns thick. It should be noted that the polymer may be applied by methods other than spin-coating.

Figure 8:
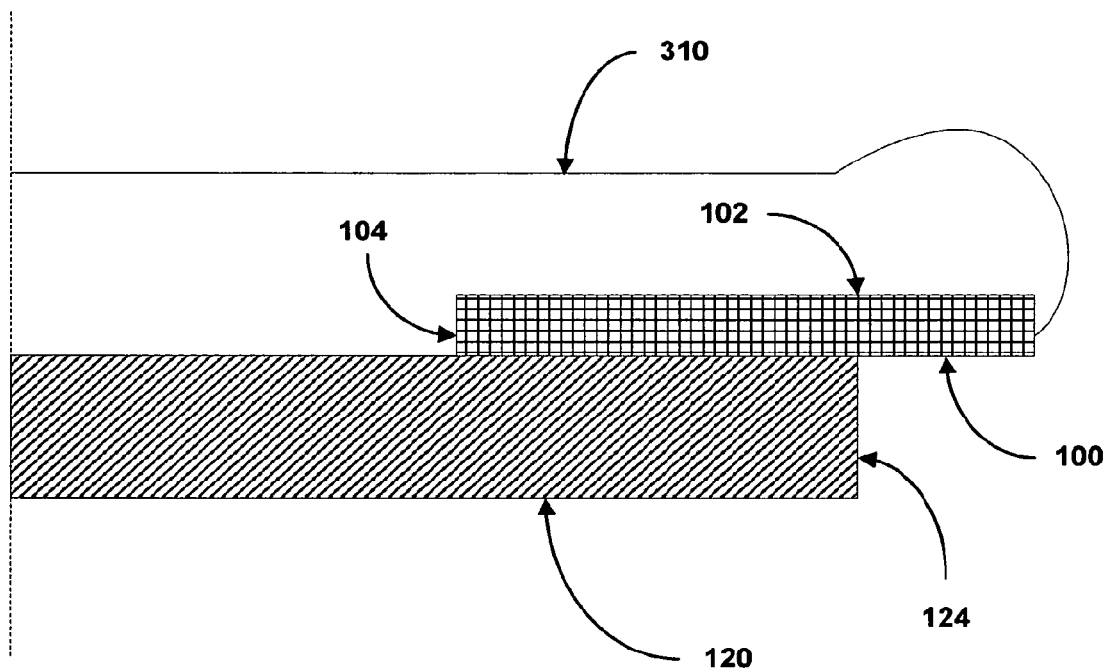
FIG. 8 is a schematic diagram providing an ideal cross-sectional view of the substrate, peel initiator, and thin film, after coating the thin film onto the substrate.

FIG. 8 is a schematic diagram providing an ideal cross-sectional view of the substrate 120, peel initiator 100, and thin film 310, after coating the thin film 310 onto the substrate 120. As is shown by FIG. 8, an outer edge 124 of the substrate 120 is overlapped by the peel initiator 100. In addition, after coating the thin film 310 onto the substrate 120, a top surface of the peel initiator 100 is covered by the thin film 310.

The thickness of the peel initiator 100 can be, at most, equal to the final thickness of the thin film 310, to guarantee that the fluid will overflow a step 104 made by the peel initiator 100. In such extreme cases, the step formation and a pinch-off region near the step 104 are critical locations. By having the peel initiator 100 thickness much smaller than the thin film 310 thickness, coating will go over the peel initiator 100 and a less pronounced effect will be provided above the step 104.

Figure 9:
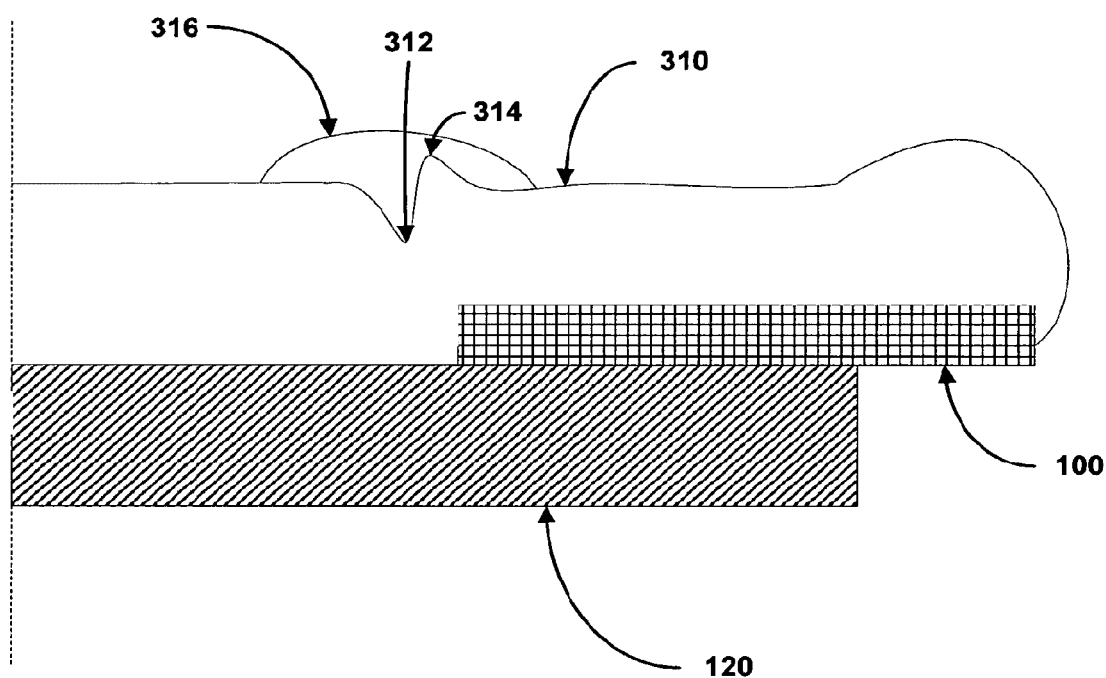
FIG. 9 is a schematic diagram providing a cross-sectional view of the substrate, peel initiator, and thin film, after coating the thin film onto the substrate, where a thin film trough and ridge are formed above a step.

FIG. 9 is a schematic diagram providing a cross-sectional view of the substrate 120, peel initiator 100, and thin film 310, after coating the thin film 310 onto the substrate 120, where a thin film trough 312 and ridge 314 are formed above the step 104. Since the local thinning of the thin film 310 above the step 104 could be a tearing risk to the thin film 310, additional PDMS 316 may be poured over the trough 312 and ridge 314 for additional support.

As shown by block 206, after coating the PDMS onto the substrate 120, the substrate 120, PDMS thin film 310, and peel initiator 100 are baked to allow curing of the thin film 310. In accordance with the present invention, the material of the peel initiator 100 does not degrade or undergo significant deformations. For exemplary purposes, the baking process may occur are approximately 80 degrees Celsius, although other temperatures may be used. The result after baking is curing of the PDMS film 310.

As is shown by block 208, after baking, the peel initiator 100 and thin film are removed from the substrate 120. The overhang of the peel initiator 100 around the substrate 120 allows for easy initiation of the peeling process. In addition, the use of a stiff material as the peel initiator 100, as mentioned above, also allows for better purchase on the thin film 310. Specifically, the use of a peel initiator 100 enables peeling through kinematics (conditions based on geometry) rather than parameters of material failure, which could result in unstable peeling. When the peel initiator 100 is included, the physics of the peeling process is dominated by the peel initiator 100, as the flexural rigidity of the peel initiator 100 is much greater than that of the PDMS thin film. Specifically, if we hold the peel initiator 100 and roll it off the substrate 120, the peel initiator 100 provides the necessary strain energy release rate for the process. The PDMS thin film 310 would then peel off without the risk of tearing or wrinkling. It should be noted, however, that even when the peel initiator 100 is rolled off, there is the risk of instability.

Due to the inner perimeter of the peel initiator 100 being smooth and concave, the peel initiator 100 avoids singularities and re-entrant corners at the inner perimeter, thereby allowing for peeling from any direction. Specifically, the inner perimeter, which forms the boundary between the peel initiator 100 and the thin film being peeled, is the most vulnerable location for peel initiator approach. When peeling by hand using the peel initiator 100 or when combined with a roller for an automated approach (as mentioned below), the operator applies a moment on the peel initiator 100. This moment is balanced by a concentrated force at the inner perimeter of the peel initiator 100. Sharp corner singularities in the inner perimeter could serve as regions for stress concentration and become likely candidates for tearing the thin film. In addition, as mentioned above, to reduce the effect of the corner singularities, the thickness of the peel initiator 100 is sufficiently smaller than the total thickness of the film 310.

While the abovementioned manual process is beneficial, peeling of the thin film 310 and peel initiator 100 from the substrate 120 by hand is a slow process. In fact, to provide a beneficial manufacturing process for PDMS films key needs include accuracy, high yields, and film handling strategies. For purposes of effective thin film manufacturing, and to remove any instabilities involved in manual removal of the thin film 310, a roller may be used, having a compressive preload for peeling films with the peel initiator 100.

Figure 10:
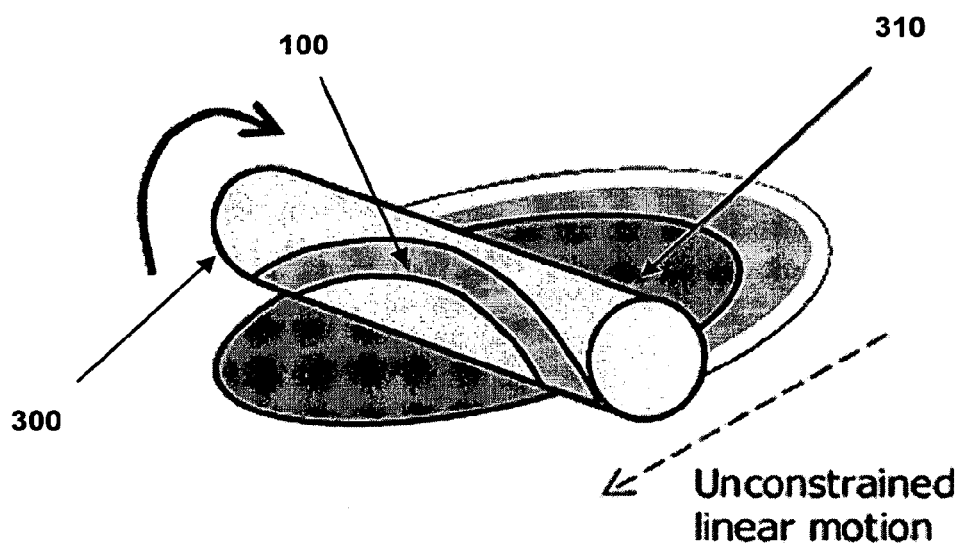
FIG. 10 is a schematic diagram showing use of a roller for peeling of the peel initiator from the thin film.
Figure 11:
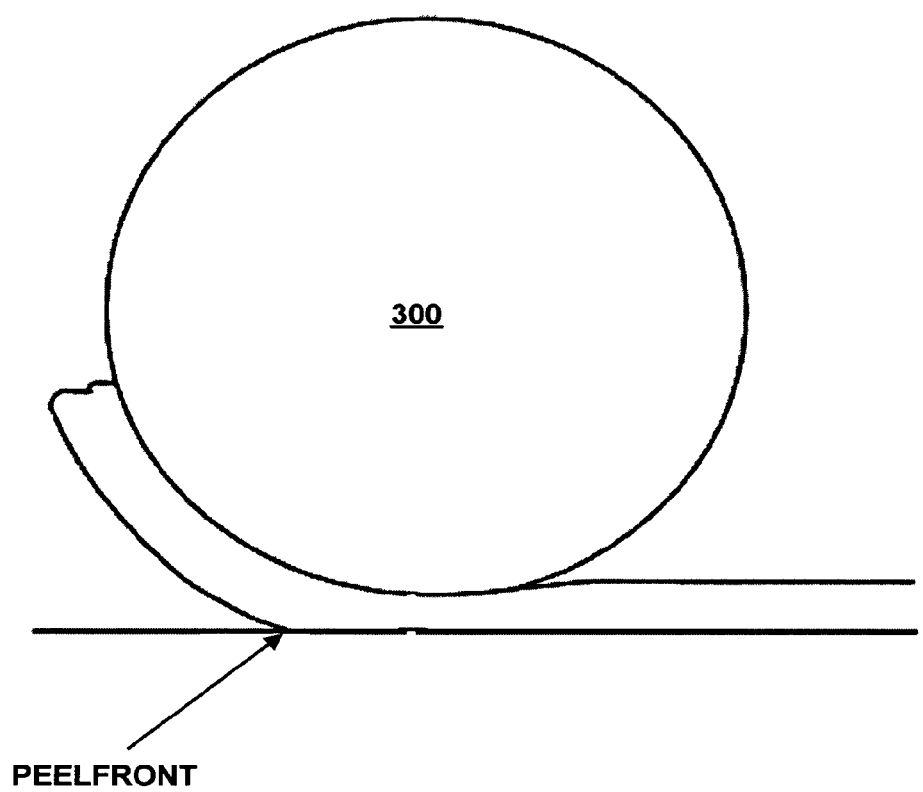
FIG. 11 is a schematic diagram illustrating peel-front.

FIG. 10 is a schematic diagram showing use of a roller 300 for peeling of the peel initiator 100 from the thin film 310. In accordance with one embodiment of the invention, to control the advance of peel-front (shown by FIG. 11) in a deterministic fashion, a cylindrical roller 300 may be used to hold the peel initiator 100 against and roll along the surface of the substrate 120. As the roller 300 rolls, the peel initiator 100 and the PDMS thin film 310 it carries are peeled off of the substrate 120. The roller 300 applies a compressive preload, which pinches the peel-front and prevents it from advancing any further, thereby providing for a controlled advance of the peel-front, and avoiding dynamic effects in peeling such as instability or whiplash. In accordance with one embodiment of the invention, the preload may be enabled by use of a constant force spring that is used to preload the surface carrying the substrate 120 against the roller 300.

For ease of removing the peel initiator 100 from the thin film 310, the roller 300 preferably has an adhesive thereon. In addition, it is preferred that the adhesive roller 300 be used in combination with the compressive preload to help peel the thin film 310 while controlling the peel-front. An adhesive roller 300 reduces stress concentration and micro-slip in the PDMS film 310, and avoids potential damage to the thin film 310 by tearing. For exemplary purposes, the adhesive on the roller 300 may be provided by adhesive tapes carrying acrylic pressure-sensitive adhesives (PSAs). It is beneficial to have the adhesive on the roller 300 be non-ghosting, non-reactive, and have a low tack.

It is preferred that the roller 300 width and circumference be greater than size of the thin film 310. In addition, radius of the roller 300 should not be too small such that there is a risk of permanent thin film 310 deformation in the peel initiator 100 as it is attached to the roller 300.

With the peel initiator 100 and thin film 310 removed from the substrate 120 and attached to the roller 300, the peel initiator 100 and thin film 310 must be removed from the roller 300 prior to use. Such a separation can be performed by attaching the peel initiator 100 and pulling it away from the roller 100. This process is also referred to here in as offtake of the peel initiator 100 and thin film 310. One of three possible concepts can be incorporated at the time of starting the adhesion of the peel initiator 100 to the roller 300, right before the PDMS thin film 310 has even begun to be peeled off the substrate 120, in order to assist in the initiation of offtake: allowing small freehang of the peel initiator 100; crimping the end portion of the peel initiator 100 upwards, so that the crimp leaves a small starting length of the peel initiator 100 unadhered; or temporarily attaching a spacer wire on the peel initiator 100, which leaves a portion of peel initiator 100 unadhered at the start.

With design of the initiation of offtake addressed, continuous offtake of the peel initiator 100 and thin film 310 is addressed. The continuous offtake of the peel initiator 100 and thin film 310 from the roller 300 may be addressed in many different ways, three of which are listed for exemplary purposes below.

FIG. 12A, FIG. 12B, and FIG. 12C are schematic diagrams illustrating different stages of one exemplary system that may be used for removing the peel initiator 100 and thin film 310 from the roller 300. As a first example, a large diameter roller 400 is provided for peeling off the substrate 120 connected by a continuous web 410 to a smaller diameter roller 420. The peel initiator 100 and thin film 310 will peel off the substrate 120 and onto the web 410. When the web 410 encounters the smaller diameter roller 420, the curvature of the web 410 can be designed to cause the peel initiator 100 to peel off of the smaller diameter roller 420.

As a second example, by using a rare-earth magnet and the peel initiator 100 made out of a ferromagnetic material (e.g., low carbon steam) we can attach to the peel initiator 100 and separate the peel initiator 100 and thin film 310 from the roller 300. Alternatively, as a third example, by using a clamp, we can attach to the peel initiator 100 and separate the peel initiator 100 and thin film 310 from the roller 300.

During the post-peeling stage in an automated peeling process, the peel initiator 100 could be carried using magnetic attraction or vacuum, without any risk of contaminating the PDMS thin film 310.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A method of providing for peeling of a thin-polymer film, comprising the steps of:
    providing a substrate having a top surface, a bottom surface, and a first diameter;
    placing a peel initiator on said top surface, wherein said peel initiator has an inner diameter and an outer diameter;
    simultaneously applying a polymer on said top surface of said substrate and a top surface of said peel initiator;
    curing said polymer resulting in said thin-polymer film; and
    peeling said peel initiator from said substrate, thereby removing said thin-polymer film from said top surface of said substrate.

2. The method of claim 1, wherein said polymer is polydimethylsiloxane.

3. The method of claim 1, wherein said step of applying said polymer is provided by spin coating said polymer.

4. The method of claim 1, wherein said substrate is selected from the group consisting of glass and a Silicon wafer.

5. The method of claim 1, wherein said peel initiator is an annulus made of a stiff material, and wherein an inner perimeter of said peel initiator is smooth and convex in shape.

6. The method of claim 5, wherein said material is selected from the group consisting of metal, paper, and a polymer.

7. The method of claim 6, wherein said polymer selected as the material is Polyethylene Terephthalate (PET).

8. The method of claim 5, wherein said outer diameter of said peel initiator is larger than said inner diameter of said peel initiator, and wherein said outer diameter of said peel initiator is larger than said first diameter of said substrate, while said first diameter of said substrate is larger than said inner diameter of said peel initiator.

9. The method of claim 1, further comprising the step of removably affixing said peel initiator to said substrate prior to said step of applying said polymer.

10. The method of claim 9, wherein said step of removably affixing is performed by use of an adhesive located between said peel initiator and said substrate.

11. The method of claim 9, wherein said step of removably affixing is performed by use of a magnetic preload, wherein said peel initiator is made of ferromagnetic material, with magnets located beneath said substrate.

12. The method of claim 1, wherein said step of curing said polymer further comprises the step of baking said polymer.

13. The method of claim 1, wherein said step of peeling said peel initiator from said substrate further comprises using a roller.

14. The method of claim 13, wherein said peel initiator is removably adhered to said roller.

15. The method of claim 13, wherein a width and circumference of said roller is greater in size than size of said thin-polymer film.

16. The method of claim 1, wherein said step of applying a polymer on said top surface of said substrate and a top surface of said peel initiator results in a thin film trough and ridge in said thin-polymer film, said method further comprising the step of adding additional polymer to cover said trough and said ridge.

* * * * *